UNITED STATES PATENT OFFICE 2,390,408

ANTIFOULING COMPOSITION

George H. Young, Pittsburgh, Pa., assignor to Stoner-Mudge, Inc., Pittsburgh, Pa., a corporation of Pennsylvania No Drawing. Application October 24, 1941, Serial No. 416,386

5 Claims. (Cl. 106—15)

This invention relates to antifouling compositions capable of application to the surfaces of structures which are subjected to submersion in sea water, for the purpose of preventing fouling by *Cirripedes crustacea* (barnacles), tube worms, Bryozoa, and other marine organisms. It relates specifically to antifouling coating materials including in their composition the undissociable toxic condensation products derived from certain heterocyclic nitrogen bases, and mercury salts, as hereinafter fully set forth. My antifouling compositions find particular application in the protection from fouling of metal structures such as ship hulls, pier supports, and flying boat hulls and pontoons, where use of prior-art antifouling paints containing ionizable heavy metal compounds results in deleterious galvanic corrosion due to the electrochemical activity of dissimilar metals in contact. It will, however, be understood that they are equally applicable to non-metallic surfaces.

In a previous application filed June 5, 1941, Serial No. 396,754, there were described effective antifouling compositions consisting of undissociable toxic condensation products derived from certain aromatic and substituted aromatic hydrocarbons and mercury salts, of which phenyl mercuric acetate is typical. I have now experimented further, and have discovered that certain undissociable pyridine base mercurials, resulting from the condensation of certain high-boiling coal tar pyridine bases with mercuric salts are unexpectedly and strongly active against marine organisms generally, and particularly against algae, *Cirripedes crustacea*, Bryozoa, and tube worms. In certain applications these condensation products are more strongly lethal than are the compositions of my previous invention. The reason for this superiority is not known. It may reside in the fact that the pyridine base mercurials are appreciably more stable than the simple aromatic mercurials, and are thus less subject to degradation on continued exposure to the atmosphere when the surface is unavoidably out of contact with water. It may reside in a slightly increased water solubility, enabling lethal concentrations to be more rapidly established at the water-coating interface.

It may be that the heterocyclic nitrogen base-mercury complexes are themselves specifically more lethal than the simple aromatic mercurials. Whatever the mechanism whereby they operate, antifouling coatings containing these heterocyclic nitrogen base-mercury condensation products are particularly effective, and surpass in protective ability even those prior art compositions containing large amounts of inorganic copper and mercury compounds.

Not all pyridine compounds are capable of condensation with mercury, as is well known. I have found that suitable antifouling toxic agents can be prepared only from those heterocyclic nitrogen bases which have at least two reaction-favorable positions available in the parent benzene ring. By this, I mean that only those compounds having at least one $\beta$ carbon, linked to a hydrogen atom, are capable of condensing with mercury salts to yield my desired condensation product. In general I prefer as the heterocyclic nitrogen base component of my toxic condensation product any one of the "pyridine bases," which comprise pyridine, quinoline, and isoquinoline, together with their lower alkyl substituted derivatives, and their hydroxy and halogenated derivatives; by "lower" I mean that the substituting radicals may be methyl, ethyl, propyl, butyl, and higher alkyl radicals containing up to 6 carbon atoms. By specifying "hydroxy and halogenated derivatives" it will be understood that I mean to include derivatives containing halogen and/or hydroxy groups in either the parent heterocyclic ring, in the substituting radicals, or in both.

Typical pyridine bases which may be advantageously employed in the preparation of my toxic condensation products are tabulated below:

| | |
|---|---|
| Pyridine | $\beta$ Hydroxy pyridine |
| $\alpha$ Methyl pyridine | Quinoline |
| $\beta$ Methyl pyridine | Quinaldine |
| $\gamma$ Methyl pyridine | Carbostyril |
| $\alpha\beta$ Dimethyl pyridine | $\alpha\alpha$ Dipyridyl |
| $\alpha\gamma$ Dimethyl pyridine | $\alpha\alpha\alpha$ Tripyridyl |
| $\alpha\alpha\beta$ Trimethyl pyridine | $\alpha$ Chlor $\beta$ methyl-pyridine |
| $\beta$ Ethyl pyridine | Isoquinoline |
| $\beta$ Chlor pyridine | 3 methyl quinoline |
| $\gamma$ Hydroxy pyridine | 2,3 dimethyl quinoline |

I may successfully employ not only the pure pyridine base compounds, but fractionated cuts and/or crude still residues containing several related isomers and/or homologs. Illustrative are the several methyl pyridines, which are derived by fractional distillation from coal tar base cuts boiling above 116° C. at atmospheric pressure, as is well known. For my purposes such relatively broad fractionated cuts or still residues are as satisfactory as the isolated pure constituents.

The preparation of my toxic mercurials offers little difficulty. Thus (Whitmore, F. C. Organic Compounds of Mercury, A. C. S. Monograph No. 3 (1921)), they may be derived (1) from nuclear-substituted halo-pyridines and dilute sodium amalgam in the presence of suitable catalysts, (2) from the double salts of pyridyl diazonium chlorides and mercuric chloride, or (3) by direct mercuration of the pyridine bases using mercuric acetate.

In the usual processes of preparation, mixtures of mercuri-bis compounds

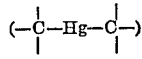

and the mono-metallo linked pyridyl mercuric salts

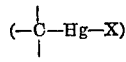

are obtained. For my purposes these complex mixtures are equally as serviceable as are the isolated pure products, so that costs of producing a usable product are not as high as would be ordinarily expected with organo-mercurials for drug and pharmaceutical purposes.

Typical organo-mercuric condensation products which I have found to be effective in my antifouling compositions are pyridyl mercuric chloride, di-pyridyl mercury, β-hydroxy pyridyl mercuric chloride, 2 methyl quinolinic mercuric chloride, di-isoquinolinic mercury, β methyl pyridyl mercuric benzoate, pyridyl mercuric bromide, α methyl pyridyl mercuric hydroxide, β-chlor pyridyl mercuric chloride, and tripyridyl mercuric acetate. In general, I prefer to use the pyridyl mercuric chlorides rather than the mercuri-bis type of compounds; the former are slightly easier to prepare in commercial quantities and their effectiveness against the marine organisms which contribute to fouling is highly satisfactory.

In the choice of suitable film-forming vehicles for my toxic organo-mercuric condensation products I am not restricted to the oils and oleoresinous type of materials usually employed in metal-containing antifouling paints. Since my toxic components are soluble in varnish and lacquer solvents, I obtain a film in which the toxic compounds are actually molecularly dispersed. As a result of this I may advantageously employ vehicles having substantially lower water permeabilities than dare be the case with the usual prior art compositions; consequently, my improved antifouling coatings have a substantially longer service life, and are themselves protected against corrosive influences which are destructive to the underlying surface.

I have found that practically any film-forming vehicle which yields films permeable to water at a rate of not less than 5 milligrams of water per mil of film thickness per square inch per 24 hours when tested by the free film diffusion-cell method (Wray and Van Horst, Ind. Eng. Chem. 28, 1268-9 (1936)), will function satisfactorily as the film-forming carrier for my toxic primary condensation products. While there is no fixed upper limit to the permeability of my vehicles, there is manifestly no advantage in employing a vehicle which is so rapidly permeable as to permit the toxic component to be leached out in a short time. I have found that vehicles having permeabilities not greater than 200 milligrams of water per mil of film thickness per square inch per 24 hours are generally adequate for my purpose, though I prefer vehicles of permeability in range of 10 to 130.

I find that the so-called "spar-varnishes" made from phenol-aldehyde resins having oil lengths of 25-50 gallons, the oils being typically linseed, tung, oiticica, or mixtures of these, are excellent carriers for my toxic organo-mercuric condensation products. For certain special applications, as to flying boat hulls and pontoons, it may be advisable for other reasons to employ a varnish or lacquer based on non oil-containing resins of the polyvinyl chloride, polyvinyl chloride-acetate, chlorinated rubber, cellulose ester, polymethyl methacrylate type, or cellulose ether type. I may also advantageously employ as vehicles the resins derived from condensation of polybasic acids with polyhydric alcohols (with or without oil modification), ester gum varnishes, urea-formaldehyde condensation products, cumarone-indene resins, cyclo- and dicyclo-pentadiene resins, and similar resins of the greatest diversity and variety.

For the safe of simplicity I shall throughout the specification and claims refer to these film-forming vehicles as "permeable organic film-forming vehicles," and it will be understood that I mean to include any film-forming coating material having a permeability rate of 5 to 200 milligrams of water per mil of film thickness per square inch per 24 hours when tested by the previously cited diffusion-cell method.

While my antifouling compositions may advantageously be employed as clear lacquers or varnishes, they may be pigmented in the usual manner with the familiar dyes and pigments. My antifouling compositions containing aluminum powder as pigment are excellent for coating flying boat hulls and pontoons. My antifouling compositions pigmented with zinc oxide or with zinc chromate are particularly satisfactory for use on aluminum or magnesium alloys since such pigments are corrosion inhibitors in this case, and the resulting pigmented compositions are equally protective against corrosion and fouling.

There is no fixed limitation upon the amount of toxic component which may be incorporated with the film-forming vehicle; there is, however, a practical upper limit in that too great an addition may yield films which are soft, non-adherent, and easily damaged. Similarly, there is a practical lower limit to the amount of toxic component which should be added. While my experiments indicate that as little as 2 per cent by weight of toxic component imparts effective antifouling properties, I prefer to employ from 15 to 50 per cent by weight, based on the total non-volatile content of the formulation.

My antifouling compositions are in no wise to be confused with prior art compositions, containing heavy metal inorganic compounds, typically copper oxide and mercuric oxide. The toxicity of these inorganic compounds depends upon their ability to dissociate in water to liberate lethal concentrations of toxic ions. In contrast to this behavior, my compositions do not yield mercuric ions in water. Laboratory experiments conclusively proved that at concentrations even greater than $1/1000$ molal (sufficient to produce death with Daphnia as test animal in less than 15 minutes after contact) there were no free mercury ions present, demonstrated by the fact that no black precipitate could be obtained with ammoniacal hydrogen sulfide, nor could a yellow precipitate be obtained with sodium hydroxide—both of which are sensitive tests for free or dissociated mercury ions. As a result of this undissociable character of my toxic ingredients, my antifouling compositions can be safely employed on active metals, such as aluminum, and magnesium alloys without danger of electrochemical corrosion and pitting due to the galvanic action of dissimilar metals in contact. Thus, my compositions are particularly applicable to aircraft pontoons and the like, where prior art compositions containing inorganic mercury and copper compounds may not be used without danger of galvanic corrosion.

The following examples will serve to illustrate my invention, it being understood that I am not limited to the specific materials there described, nor to the specific compositions given.

*Example I*

25% ester gum varnish solids
    25 gallon oil length containing:
        50% tung oil
        50% linseed oil
25% pyridyl mercuric chloride
    50% mixed solvent consisting of:
        60% xylol
        10% dipentene
        30% mineral spirits This preparation was applied as a clear varnish.

*Example II*

15% medium viscosity ethyl cellulose
5% di-pyridyl mercury
    80% mixed solvent consisting of:
        50% butyl acetate
        30% methyl isobutyl ketone
        20% xylol This composition was pigmented with 1½ pounds per gallon of aluminum powder.

*Example III*

35% phenolic varnish solids
    33 gallon oil length on Bakelite BR-254 (a p-phenyl phenol-formaldehyde oil soluble resin)
        60% tung oil
        40% linseed oil
15% γ-hydroxy pyridyl mercuric chloride
    50% mixed solvent consisting of:
        80% mineral spirits
        10% xylol
        10% dipentene The above clear toxic-containing vehicle was pigmented with an 80/20 mixture of zinc dust and zinc oxide at a pigment-to-varnish ratio of 75/25, all figures by weight.

*Example IV*

35% varnish solids
    25% 33 gallon oil length on Bakelite BR-1329 (an alkyl phenol-formaldehyde oil soluble resin) 100% tung oil
    10% polyhydric alcohol-polybasic acid resin modified with linseed oil (Rezyl 869)
15% quinolinic mercuric chloride
    50% mixed solvent consisting of:
        80% mineral spirits
        10% xylol
        10% dipentene The above clear toxic-containing vehicle was pigmented with 1½ pounds per gallon of aluminum paste.

And now, having described my invention and having shown the advantages attendant on its use, I claim as my invention:

1. An antifouling composition for application to surfaces subjected to immersion in sea water and adapted to prevent the attachment thereto of fouling marine organisms while exerting a protective non-corroding action on said surfaces, said composition comprising as the sole film forming agent a substantially water insoluble solvent-dispersed film forming organic vehicle having a permeability of 5 to 200 milligrams of water per mil of film thickness per square inch per 24 hours and a toxic component which is a condensation product of a mercuric salt and a heterocyclic nitrogen base selected from the group consisting of the pyridine, quinoline and isoquinoline bases together with their lower alkyl, hydroxy and halogenated derivatives, said condensation product having mercury directly joined to a carbon atom in the heterocyclic nitrogen base system, the effective proportion of toxic compound amounting to from 2 to 50% by weight of the total non-volatile content.

2. The composition of claim 1 in which the toxic component is a mercury derivative of pyridine.

3. The composition of claim 1 in which the toxic component is a mercury derivative of a fractionated coal tar base cut containing at least one pyridine base boiling above 116° C. at atmospheric pressure.

4. The composition of claim 1 in which the solvent-dispersed permeable organic film-forming vehicle is a nitrocellulose lacquer.

5. An antifouling composition for application to surfaces subjected to immersion in sea water and adapted to prevent the attachment thereto of fouling marine organisms while exerting a protective non-corroding action on said surfaces, said composition comprising as the sole film forming agent a substantially water insoluble solvent-dispersed film forming organic vehicle having a permeability of 5 to 200 milligrams of water per mil of film thickness per square inch per 24 hours and a toxic component which is a condensation product of a mercuric salt and a heterocyclic nitrogen base selected from the group consisting of the pyridine, quinoline and isoquinoline bases together with their lower alkyl, hydroxy and halogenated derivatives, said condensation product having mercury directly joined to a carbon atom in the heterocyclic nitrogen base system, the effective proportion of toxic compound amounting to from 15 to 50% by weight of the total non-volatile content.

GEORGE H. YOUNG.